UNITED STATES PATENT OFFICE.

CLIFFORD RICHARDSON, OF NEW YORK, N. Y., ASSIGNOR TO THE BARBER ASPHALT PAVING COMPANY, OF PHILADELPHIA, PENNSYLVANIA, A CORPORATION OF WEST VIRGINIA.

PROCESS OF MANUFACTURING AND LAYING BITUMINOUS SHEET-PAVEMENTS AND MATERIALS THEREFOR.

1,090,792.  Specification of Letters Patent.  Patented Mar. 17, 1914.

No Drawing.   Application filed January 12, 1910.  Serial No. 537,641.

*To all whom it may concern:*

Be it known that I, CLIFFORD RICHARDSON, of New York, in the county of New York and State of New York, have invented certain new and useful Improvements in the Process of Manufacturing and Laying Bituminous Sheet-Pavements and Materials Therefor, whereof the following is a specification.

Ordinarily in the manufacture and laying of a bituminous road surface, in which rock of a uniform size or a mineral aggregate is combined with the bituminous cementing material, the rock or aggregate and the cement are mixed in proper proportions, each in a heated condition, and are placed, spread and compacted while still hot; or the bituminous cementing material is applied to cold stone or aggregate immediately on the spot where the work is being constructed or after it has been constructed, and either before or after it has been put into the surface. The former method requires immediate use of the hot coated stone or aggregate before it has cooled, since on cooling it becomes agglomerated into a mass which cannot be separated and properly manipulated or spread if the original cementing material is of sufficient density or consistency to have a satisfactory cementing capacity.

By my invention, while coating hot or warm stone with hot bituminous cementing material, I avoid the necessity of laying such material before it has cooled by producing it in a form in which each of the coated particles can be readily separated, manipulated, spread and compacted to form a roadway surface, thus enabling the stone or mineral aggregate to be coated with a bituminous cementing material of sufficiently hard consistency at the quarry, crusher, or at a plant suitable for its preparation, and enabling it afterward to be transported for any distance and held for any length of time before its use without adhesion which will prevent its manipulation.

In the practice of my process I take stone of a character suitable for the construction of a bituminous macadam pavement or a combination of mineral matter of different sizes as an aggregate for this purpose. The stone or mineral aggregate is heated and mixed with a suitable quantity of a bituminous cementing medium, also liquefied by heat, the mixture being effected mechanically or by hand or by any suitable machinery. Instead of transporting this mixture and laying it while it still retains its heat, I suddenly chill and wet the hot mixture, either by a spray of cold water thrown upon it, or by dropping the entire mixture into a tank of cold water. The result of this sudden chill applied by water at this step of the process, is that the stone or mineral aggregate and the bituminous cement are converted into a mass in which the particles do not adhere to one another to such a degree as to prevent the mixture, even after storage if desired, from being transported, spread, manipulated and compacted. The sudden chilling by water is essential to the success of the process. The high specific heat of water not only effects the chilling much more rapidly than can be accomplished by other means, as for example by the use of cold air, but the presence of water on the surface of the cooled asphalt greatly decreases its adhesiveness, so that there is little or no adhesion between the separately cooled and wet lumps, and in this condition the whole mass soon cools down to a temperature at which compaction is only possible under the pressure of a road roller.

If a mixture of hot stone or a mineral aggregate and hot bituminous cement, such as I have described were held for any length of time and allowed to cool in the air, without being chilled suddenly with water, it would form a solid adhesive conglomerate mass, which would be incapable of being subsequently properly spread, laid and compacted as a pavement or road surface, but according to my method, the mass consisting of stone or aggregate and bituminous cement in proper proportions, is separable as distinguished from conglomerate and its parts do not so adhere together as to prevent the mass from being properly spread, rolled and compacted to form a pavement or the surface of a highway.

In practice the cold material is transported to the place where it is to be laid, where it is readily broken up or crumbled by rakes or tamping irons. It is thereupon spread as by rakes, and is then compacted by tamping and rolling, which process of compaction continues when the road is thrown open to rolling traffic.

Having thus described my invention, I claim:

The process of manufacturing and laying a bituminous paving material, which consists in heating a stone or mineral aggregate and a bituminous cementing material, combining the two while hot, suddenly chilling and wetting the mixture by application of cold water, and thereafter without reheating spreading and compacting the mixture to form a pavement.

In testimony whereof, I have hereunto signed my name at New York city this tenth day of January 1910.

CLIFFORD RICHARDSON.

Witnesses:
GEORGE WIRTH,
NORMAN SWEET.